J. Michener,
6413X
No Printed Specification Available
Water Wheel.
Patented Mar. 9, 1831.
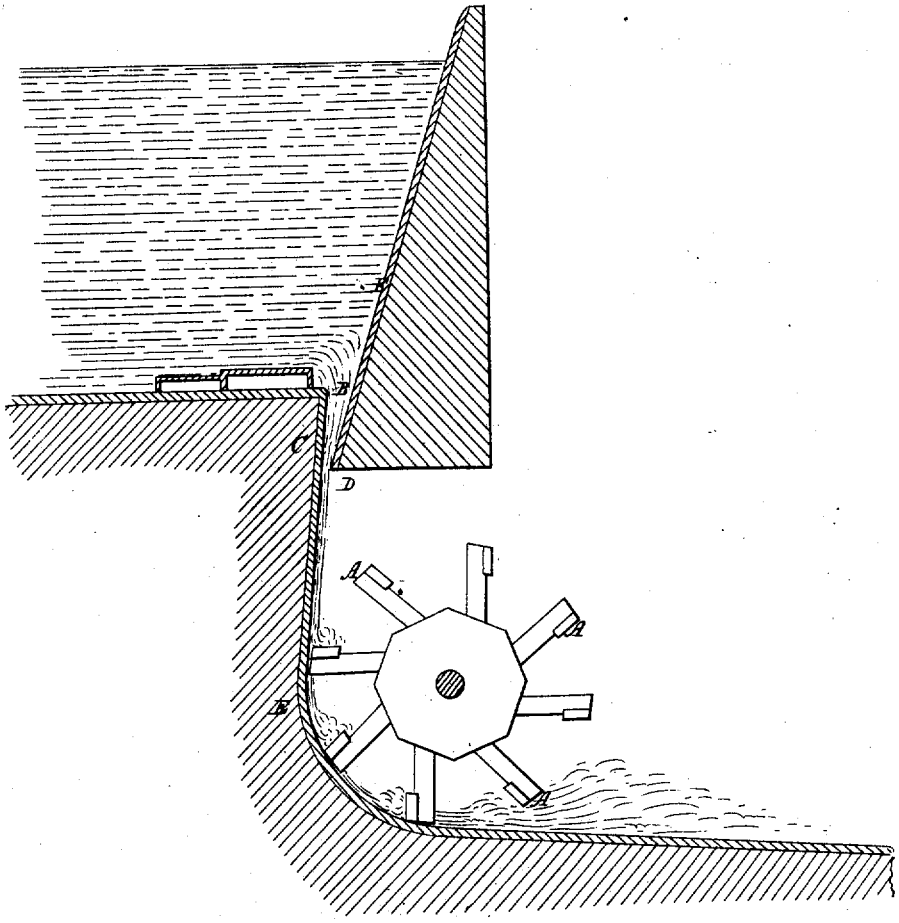
N. PETERS, PHOTO-LITHOGRAPHER, WASHINGTON, D. C.

6413X

Joseph Michener
Letters Patent

The Schedule referred to in these Letters Patent and making part of the same containing a description in the words of the said Joseph Michener himself of his improvement in the mode of applying water on water wheels

---

F. G the breast of the dam. B. Is the funnel to pass the water through two inches at the bottom and eight inches at the top, thirteen inches from B, to D.

C. E. Is the wall of the dam; inclines two inches back from the centre of the water wheel to the top of the wall A, A, A, A, are the buckets eight in number to a 26 inch wheel in diameter 1, 1, 1, Are the three buckets that the water act on at a time, the arms are seven inches long I claim the setting of the arms back which prevents the water falling towards the Shaft, which will give more power on the wheel, also the inclination of the breast wall of dam and also the fall funnel and applying the water or action of the water on three buckets at a time.

Witnesses
Jn: Jones
James Fife

Joseph Michener [illegible]

200